No. 868,461. PATENTED OCT. 15, 1907.
J. B. LOCKWOOD.
GUARD FOR BICYCLES.
APPLICATION FILED JUNE 4, 1907.
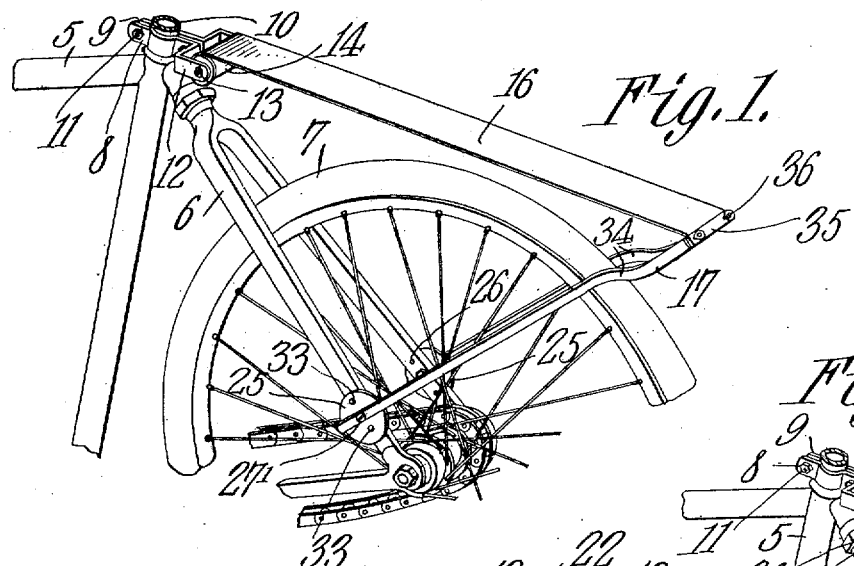
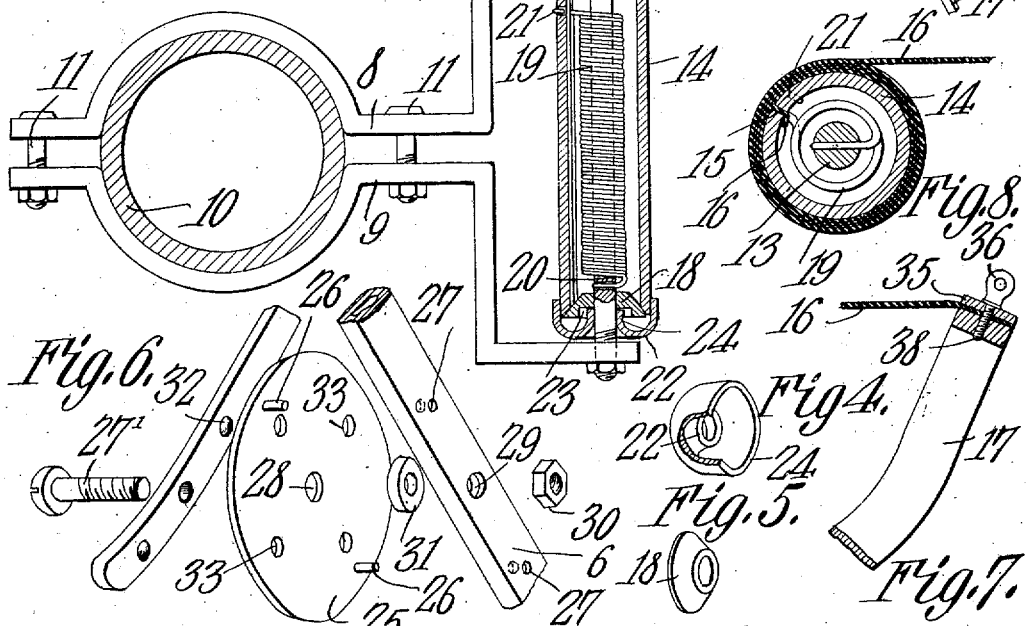
WITNESSES:
James B. Lockwood, INVENTOR.
By C. A. Snow & Co.
ATTORNEYS

UNITED STATES PATENT OFFICE.

JAMES B. LOCKWOOD, OF RIVERSIDE, CALIFORNIA.

GUARD FOR BICYCLES.

No. 868,461.

Specification of Letters Patent.

Patented Oct. 15, 1907.

Application filed June 4, 1907. Serial No. 377,168.

*To all whom it may concern:*

Be it known that I, JAMES B. LOCKWOOD, a citizen of the United States, residing at Riverside, in the county of Riverside and State of California, have invented a new and useful Guard for Bicycles, of which the following is a specification.

This invention relates to mud guards or shields for bicycles and similar vehicles and has for its object to provide a comparatively simple and thoroughly efficient device of this character capable of being quickly attached to the frame of a bicycle and which will protect the rider from mud and other foreign matter thrown up by the revolution of the wheels.

A further object of the invention is to provide a mud guard including a flexible ribbon or shield having one end thereof attached to a pivoted supporting bracket or yoke and its opposite end fastened to a spring actuated drum whereby the shield may be extended to operative position over the wheel or wound upon the drum when not in use.

A further object is to provide means for locking the pivoted supporting bracket or yoke in operative or inoperative position and further to provide improved means for securing the pivoted end of said yoke or bracket to the rear fork of the bicycle frame.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a mud guard or shield constructed in accordance with my invention showing the same in position on a bicycle. Fig. 2 is a detail perspective view showing the shield or ribbon in contracted or inoperative position. Fig. 3 is an enlarged transverse sectional view of the spring actuated roller and its supporting bracket. Fig. 4 is a detail perspective view partly in section of one of the caps of the spring actuated roller. Fig. 5 is a sectional view of one of the cone bearings. Fig. 6 is a detail perspective view of one of the bearing plates and its associated parts, a portion of the rear fork and yoke being shown in connection therewith. Fig. 7 is a longitudinal sectional view of the upper end of the pivoted supporting bracket or yoke showing the manner of positioning the flexible shield or ribbon on said yoke. Fig. 8 is a transverse sectional view of the spring actuated drum.

Similar numerals of reference indicate corresponding parts in all of the figures of the drawings.

The improved device forming the subject matter of the present invention is principally designed for attachment to bicycles and similar vehicles and by way of illustration is shown in connection with a bicycle of the ordinary construction in which 5 designates the frame, 6 the rear fork and 7 the rear wheel mounted for rotation between the legs of the fork in the usual manner.

The device consists of an attaching bracket preferably formed in two sections 8 and 9 having their intermediate portions bowed laterally and adapted to clamp the seat post 10, said bracket being secured in position on the post in any suitable manner, as by clamping screws 11. The free ends of the sections 8 and 9 are extended laterally to form spaced parallel arms 12 the terminals of which are connected by a bolt or pin 13 on which is mounted for rotation a spring actuated roller or drum 14. The drum 14 is split longitudinally, as indicated at 15 for the reception of one end of a flexible ribbon or shield 16 the opposite end of which is secured to a pivoted supporting bracket or yoke 17.

Seated in the opposite ends of the drum 14 and rigidly secured to the pin or bolt 13 in any suitable manner are tapering disks 18 which form cone bearings for the opposite ends of the drum 14 thereby to prevent undue friction on the same.

Disposed within the drum 14 and surrounding the pin or shaft 13 is a coiled spring 19 one end of which is secured to the shaft, as indicated at 20, while the opposite end thereof is extended through the longitudinal slot 15 and is seated in a recess or opening 21 formed in the exterior surface of the drum, as shown.

The shield or ribbon 16 is clamped within the slot 15 by means of oppositely disposed caps 22 which engage the exterior walls of the drum 14 and serve to contract the walls thereof so that the longitudinal edges of the drum at the slot 15 will bite into the ribbon and thus retain the same in position on the drum.

The exterior walls of the cones 18 are preferably formed with recesses 23 adapted to receive the inwardly extending bearings 24 of the caps 22 so as to permit the caps together with the drum to rotate on the cones.

Secured to the opposite legs of the rear fork 6 are spaced plates or disks 25 having laterally extending pins 26 secured thereto and adapted to enter correspondingly shaped openings 27, formed in the legs of the fork thereby to prevent rotation of the disks on said forks.

The ribbon supporting bracket or yoke 17 is pivotally mounted for swinging movement on the plates or disks 25 by means of pins 27' which extend through the adjacent ends of the yoke and also through suitable openings 28 and 29 formed in the disks 25 and the adjacent legs of the rear fork 6, respectively for engagement with clamping nuts 30.

Suitable washers 31 are preferably mounted on the pins or screws 27' and interposed between the disks 25 and the adjacent legs of the fork so as to prevent undue friction on said fork.

Extending laterally from the inner faces of the opposite legs of the shield supporting bracket are locking lugs 32 having curved bearing surfaces adapted to enter suitable openings or locking recesses 33 formed in the disks or plates 25, thereby to lock the shield supporting bracket in operative and inoperative position. The openings 33 are preferably arranged in pairs so that when the shield supporting bracket is moved rearwardly to operative position with the shield extended over the rear wheel of the bicycle the locking lugs 32 will enter one set of the openings 33 and when the shield supporting bracket is moved to inoperative position with the shield wound upon the drum the lugs 32 will enter the opposite set of locking recesses thereby preventing accidental movement of the shield supporting bracket when in both operative and inoperative position.

Attention is here called to the fact that the lugs 32 normally and yieldably bear against the exterior face of the disks 25 so that when the locking lugs register with the openings 33 they will spring into said openings and thus effect the locking of the shield supporting bracket.

In operation when it is desired to use the mud guard or shield a rearward pull is exerted on the bracket 17 which disengages the locking lugs 32 from one set of the recesses or openings 33 so that the bracket may be moved rearwardly to the position shown in Fig. 1 of the drawings and in which position the lugs 32 will enter the adjacent set of locking recesses and thus support the shield or guard in position over the rear wheel of the bicycle. In order to release said shield it is merely necessary to exert a slight forward pressure on the bracket 17 when the lugs 32 will become disengaged from the adjacent locking recesses 33 in which event the action of the coiled spring 19 will rotate the drum so as to wind the flexible ribbon or shield on the latter, as best shown in Fig. 2 of the drawings.

Attention is here called to the fact that the upper or closed end of the yoke or bracket 17 is bent laterally or off-set, as indicated at 34, so as to permit the yoke to lie snugly against the rear fork of the bicycle when the bracket is in closed position and thus prevent wabbling or rattling on the bicycle frame.

One end of the apron or ribbon 16 is preferably reinforced and strengthened by the provision of a transverse metallic strip or bar 35 having openings formed therein for the reception of suitable pins 36 which enter threaded openings 38 formed in the upper or closed end of the bracket 17 whereby the ribbon or apron may be readily attached to or detached from the supporting bracket.

While the device is principally designed for use in connection with bicycles it is obvious that the same may be used in connection with all kinds of wheeled vehicles or wherever a device of this kind is found desirable.

It will also be understood that the device may be used as a guard or shield for either the front or rear wheel of the bicycle and that the spring actuated drum may be secured to any desired portion of the bicycle frame.

From the foregoing description it is thought that th construction and operation of the device will be readil understood by those skilled in the art and further d scription thereof is deemed unnecessary

Having thus described the invention what is claime is:

1. The combination with a bicycle frame, of a sprin actuated drum mounted for rotation on the frame, plate secured to the opposite sides of the fork of the frame, yoke having spaced legs pivotally mounted for swingin movement on the adjacent plates and movable laterall to operative and inoperative position, a shield forming connection between the drum and the free end of the yok and means carried by the legs of the yoke and adapted t engage the plates for locking the supporting member i operative and inoperative position.

2. The combination with a bicycle frame, of a sprin actuated roller mounted for rotation on the frame, plate secured to the opposite sides of the fork of the frame an provided with locking recesses, a supporting member pi otally mounted for swinging movement on the plates an movable laterally to operative and inoperative position, flexible shield connecting the drum and supporting membe and locking lugs extending laterally from the supportin member and adapted to engage the locking recesses fc supporting said member in operative and inoperative p sition.

3. The combination with a bicycle frame, of a sprin actuated drum mounted for rotation on the frame, plate secured to the opposite sides of the fork of the fram pins secured to the plate and engaging corresponding r cesses in the fork, a supporting member pivotally mounte for swinging movement on the plates, a shield forming connection between the drum and free end of the suppor ing member, and means carried by the supporting membe and adapted to engage the plates for locking the support ing member in operative and inoperative position.

4. The combination with a bicycle frame, of a bracke secured to the frame, a spring actuated roller mounted fo rotation in the bracket, plates secured to the opposite side of the fork of the frame and provided with spaced lockin recesses, a yoke pivotally mounted for swinging movemen on the plates, a flexible connection between the drum an free end of the yoke and constituting a shield, and lug disposed on each side of the pivotal axis of the yoke an adapted to enter the recesses for locking the yoke in op erative and inoperative position.

5. The combination with a bicycle frame, of a bracke secured to the frame and provided with spaced arms, stationary shaft connecting the arms, a split drum mount ed for rotation on the shaft, a yoke pivotally mounted fo swinging movement on the fork of the frame, a flexibl shield one end of which is inserted in the split portion o the drum and the opposite end thereof secured to the fre end of the yoke, and clamping collars engaging the ex terior walls of the drum at the opposite ends thereof fo clamping the adjacent longitudinal edges of said drum i engagement with the shield.

6. The combination with a bicycle frame, of a bracke secured to the frame and provided with spaced arms, shaft connecting the arms, an expansible drum mounte for rotation on the shaft and having its opposite end spaced apart to form a longitudinally disposed slot, con bearings engaging the opposite ends of the drum, a yok pivotally mounted on the rear fork of the frame, a flexibl shield one end of which is seated in the slot in the drun and the opposite end thereof connected to the free en of the yoke, caps engaging the exterior walls of the drun for clamping the latter in engagement with the shield, an a spring surrounding the shaft and secured to the drum 7. The combination with a bicycle frame, of a bracke secured to the frame and provided with spaced arms, shaft connecting said arms, an expansible drum mounte for rotation on the shaft and provided with a longitudina slot, cone bearings engaging the opposite ends of the drum and having recesses formed therein, a yoke pivotally mounted on the fork of the bicycle, a flexible shield on end of which is seated in the slot in the drum and th opposite end thereof attached to the free end of the yoke, clamping collars engaging the exterior walls of the drum for clamping the latter in engagement with the shield and provided with lateral extensions seated in the recesses in the cone bearings, and a spring secured to the shaft and engaging the drum.

8. The combination with a bicycle frame, of a spring actuated roller mounted for rotation on the frame, plates secured to the opposite sides of the fork of the bicycle and provided with laterally extending pins engaging corresponding openings formed in said fork, a yoke pivotally mounted for swinging movement on the plates and having its upper end off-set, a flexible ribbon having one end thereof secured to the drum and its opposite end fastened to the off-set portion of the yoke, and means for locking the yoke in operative and inoperative position.

9. The combination with a bicycle frame, of a spring actuated drum mounted for rotation on the frame, disks secured to the opposite sides of the fork of the bicycle and having openings formed therein, a yoke pivotally mounted for swinging movement on the disks and having its closed end provided with threaded openings, a flexible shield one end of which is secured to the drum and the opposite end thereof to the closed end of the yoke, a plate extending transversely across one end of the shield, screws extending through the plate and engaging the threaded openings in the yoke, and locking lugs formed on the yoke and adapted to engage the recesses in the disks for locking the yoke in operative and inoperative position.

In testimony that I claim the foregoing as my own, I have hereto affixed my signature in the presence of two witnesses.

JAMES B. LOCKWOOD.

Witnesses:
J. W. RICKER,
H. B. RICHARDS.